United States Patent [19]

Collopy et al.

[11] Patent Number: 5,170,365
[45] Date of Patent: Dec. 8, 1992

[54] PROPELLER SPEED AND PHASE SENSOR

[75] Inventors: Paul D. Collopy; George W. Bennett, both of Cincinnati, Ohio

[73] Assignee: General Electric Company, Cincinnati, Ohio

[21] Appl. No.: 675,066

[22] Filed: Mar. 26, 1991

Related U.S. Application Data

[63] Continuation of Ser. No. 808,147, Dec. 12, 1985, abandoned.

[51] Int. Cl.⁵ .......................... G01P 3/42; F01D 21/00
[52] U.S. Cl. .................................... 364/565; 364/569; 361/236; 416/44; 416/35; 73/506
[58] Field of Search ............... 364/565, 569, 559, 426, 364/440; 73/460, 462, 488, 505-507, 118, 119 R; 416/34, 35, 44, 61; 361/236, 243, 244

[56] References Cited

U.S. PATENT DOCUMENTS

| | | | |
|---|---|---|---|
| 4,153,388 | 5/1979 | Naegeli et al. | 416/61 |
| 4,356,447 | 10/1982 | Hönig et al. | 364/565 |
| 4,383,303 | 5/1983 | Hoffman | 364/565 |
| 4,506,339 | 3/1985 | Kühnlein | 364/565 |
| 4,535,288 | 8/1985 | Vitulli, Jr. | 364/565 |
| 4,569,027 | 2/1986 | Nakano et al. | 364/565 |
| 4,653,981 | 3/1987 | Harner et al. | 416/34 |

FOREIGN PATENT DOCUMENTS

0059433 9/1982 European Pat. Off. .
1099928 1/1968 United Kingdom .
1565381 4/1980 United Kingdom .

Primary Examiner—Parshotam S. Lall
Assistant Examiner—Michael Zanelli
Attorney, Agent, or Firm—Jerome C. Squillaro; Bernard E. Shay

[57] ABSTRACT

A speed and phase sensor counterrotates aircraft propellers. A toothed wheel is attached to each propeller, and the teeth trigger a sensor as they pass, producing a sequence of signals. From the sequence of signals, rotational speed of each propeller is computer based on time intervals between successive signals. The speed can be computed several times during one revolution, thus giving speed information which is highly up-to-date. Given that spacing between teeth may not be uniform, the signals produced may be nonuniform in time. Error coefficients are derived to correct for nonuniformities in the resulting signals, thus allowing accurate speed to be computed despite the spacing nonuniformities. Phase can be viewed as the relative rotational position of one propeller with respect to the other, but measured at a fixed time. Phase is computed from the signals.

7 Claims, 6 Drawing Sheets

PROPELLER SPEED AND PHASE SENSOR

The invention herein described was made in the performance of work under a NASA contract and is subject to the provisions of Section 305 of the National Aeronautics and Space Act of 1958, Public Law 85-568 (72 Stat. 435; 42 USC 2457).

This application is a continuation of application Ser. No. 06/808,147, filed Dec. 12, 1985 now abandoned.

The invention relates to rpm sensors for aircraft propellers and, more specifically, to a system which measures the rpms of both propellers in a counterrotating propeller pair. The system also measures the phase relationship between the propellers.

BACKGROUND OF THE INVENTION

Figure 4:
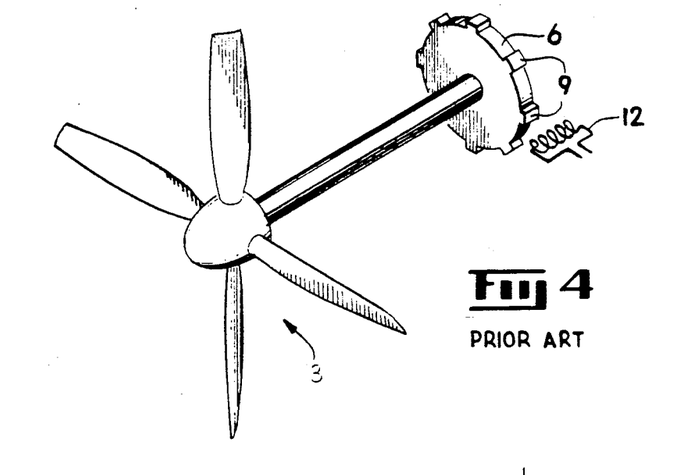
FIG. 4 illustrates a prior art sensor for propeller speed measurement.

It is common to measure the rotational speed of an aircraft propeller 3 in FIG. 4 by attaching a toothed wheel 6 (called a "target wheel") to the propeller shaft. Each tooth (or flag) 9 produces a signal in a magnetic pickup coil 12 as it passes. Additional circuitry (not shown) processes the signals. The circuitry may operate as follows in measuring rpm.

If the toothed wheel 6 has eight teeth, the circuitry measures the frequency at which teeth pass the coil, and from this frequency, infers the rotational speed. For example, if the frequency is 160 Hz (i.e. 160 teeth per second), and there are eight teeth per revolution, then the rpm inferred is 1200 rpm (i.e. $1200 = 60 \times 160/8$).

One disadvantage to this approach is that it only provides an average speed over the time interval taken by several teeth to pass the coil. Accelerations and decelerations of the propeller during the interval are not detected. Also, this approach does not provide information as to the instantaneous positions of the propeller blades. For example, it may be desirable to know the precise instant in time when blade No. 1 on the propeller was located at the 1:30 o'clock position.

OBJECTS OF THE INVENTION

It is an object of the present invention to provide a new and improved speed measurement system for aircraft propellers.

It is a further object of the present invention to provide a speed measurement system for a counterrotating pair of aircraft propellers which measures the speeds of each propeller.

It is a further object of the present invention to provide real time data as to the instantaneous rotational positions of aircraft propellers.

BRIEF DESCRIPTION OF THE DRAWING

FIGS. 9 and 10 are plots of simulations which compare the operation of one form of the invention which uses error coefficients in computing speed, with another form which does not.

SUMMARY OF THE INVENTION

In one form of the invention, a clock stores the real-times at which propeller blades cross a reference point. From these real-times, the rpm of the propeller can be computed nearly instantaneously.

DETAILED DESCRIPTION OF THE INVENTION

Figure 1:
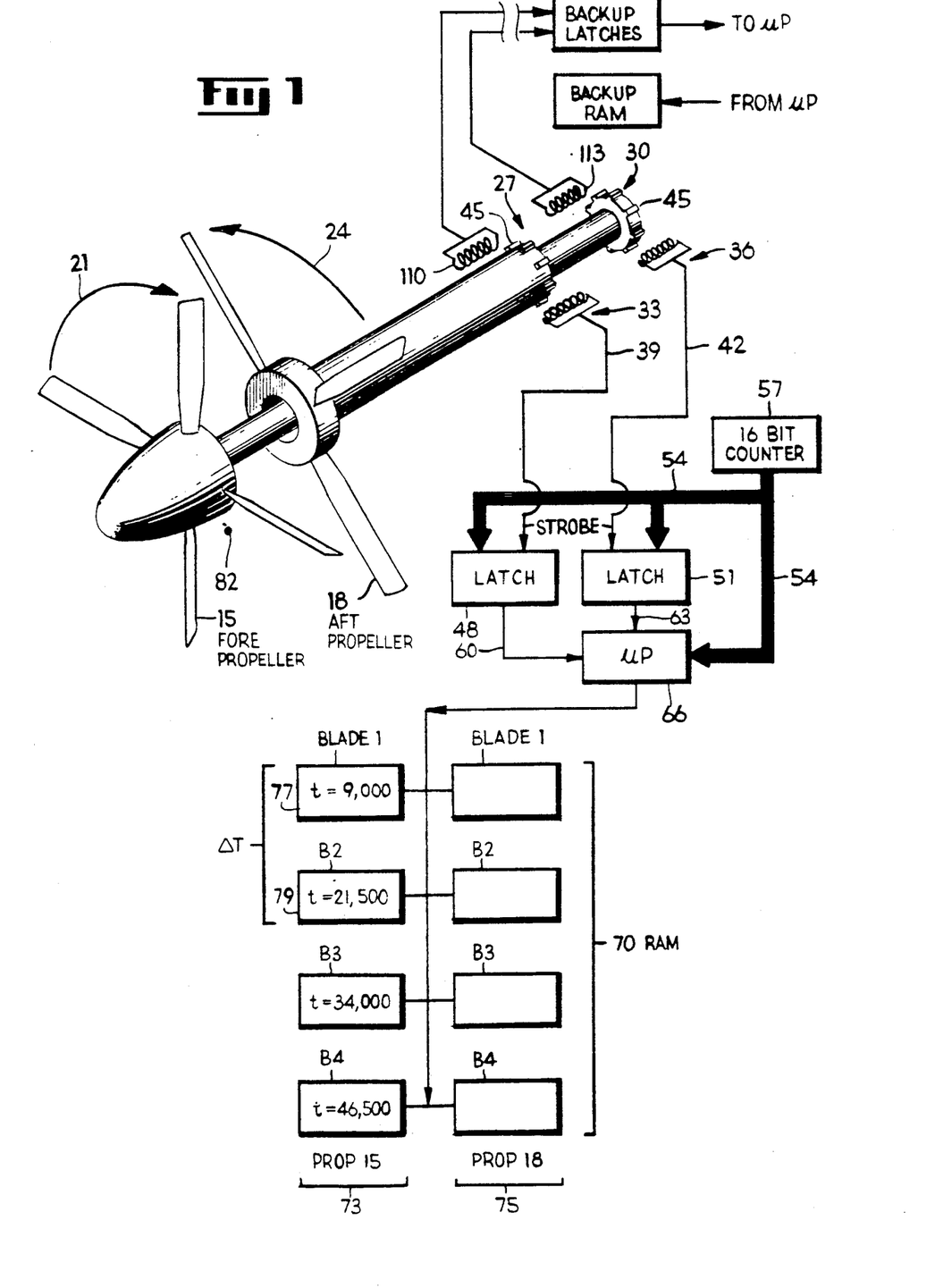
FIG. 1 illustrates one form of the invention associated with a pair of counterrotating propellers.

FIG. 1 illustrates a pair of aircraft propellers 15 and 18. They rotate in opposite directions as indicated by arrows 21 and 24, and are thus termed counterrotating. Fastened to the propellers are target wheels 27 and 30 which also rotate in opposite directions. Magnetic pick-off coils 33 and 36, known in the art, produce signals (called strobe signals herein) on strobe lines 39 and 42 in response to the passing of the teeth 45. One such coil is Model No. 726452 Fan Speed Sensor, available from Electro Corp., located in Sarasota, Fla.

Strobe lines 39 and 42 are connected to the strobe inputs of latches 48 and 51. The strobe signals thus cause the latches 48 and 51 to load the data present on data bus 54. Data bus 54 carries the output of 16-bit counter 57. 16-bit counter 57 counts from the binary number zero to the binary number $2^{16}-1$ (commonly called 64K, which is decimal 65,535) at the rate of 2 Mhz and is used as a clock. That is, the counter 57 changes 2 million times per second, in sequence, from decimal 0 to decimal 65,535, and then starts at zero ("rolls over") and continues.

The outputs 60 and 63 of latches 48 and 51 are fed to a microprocessor 66 indicated by the symbol $\mu$P. The data bus 54 also feeds the microprocessor 66. Thus, both the latches 48 and 51, as well as the microprocessor 66, have inputs from counter 57, and thus have access to a real-time signal. The microprocessor 66 is programmed according to the flowchart described by the eight steps listed in the following Table 1. A detailed description of each step follows the listing. The reader is invited to now jump to this description, which refers step-by-step to Table 1.

TABLE 1

1. Calculate time it takes for full revolution.
   Time (full revolution) = $\Delta T(1) + \Delta T(2) + \Delta T(3) + \Delta T(4) + \Delta T(5) + \Delta T(6) + \Delta T(7) + \Delta T(8)$ 2. Calculate error coefficient for the tooth opposite the current tooth. m and n are indices.
   m = (n + 4) modulo 8

$$\text{error}(m) = \frac{\Delta T(m)}{\text{Time (full revolution)}/8}$$

3. In an underspeed condition (less than 340.9 rpm), the coefficients are reinitialized to one. They will gradually converge to their correct values when the underspeed condition terminates. Underspeed exists when a latch does not change for eight consecutive readings. (This is termed the "eight-run rule.")

4. Calculate speed.

TABLE 1-continued $$\text{speed} = \frac{\text{ERROR}(n)}{\Delta T(n)} \times \frac{(60 \text{ sec/min}) \times (2,000,000 \text{ counts/sec})}{8 \text{ teeth/revolution}}$$

5. Select good sensors. (A1 and A2 refer to two sensors on one propeller. B1 and B2 refer to two sensors on the other.)
    5.1 IF absolute value (sensor A1 − sensor A2) 40.0 rpm then $$\text{speed} = \frac{(\text{sensor A1} + \text{sensor A2})}{2}$$

and
   reset the flags indicating that both fore sensors are good
   IF NOT, then do this:
    5.2 IF sensor B1 and sensor B2 are both good then
        5.2.1 IF absolute value (sensor A1 − aft speed) < absolute value (sensor A2 − aft speed) then fore speed = A1 and then set flags indicating that fore sensor A1 is good and fore sensor A2 is bad.
        5.2.2 IF NOT then fore speed = sensor A2 and set flags indicating that sensor A1 is bad and sensor A2 is good.
    5.3 IF sensor B1 and sensor B2 are not both good then pick lower.
    5.4 Repeat 5.1–5.3 for other propeller, replacing A1 by B1, A2 by B2, B1 by A1, and B2 by A2.
6. Check for sensors not reading when the engine is running.
    IF core speed > 10,000 rpm AND ABS (fore pitch − scheduled for pitch) < 3.0 degrees AND ABS (aft pitch − scheduled aft pitch) < 3.0 degrees THEN
        IF fore sensor A < 350 rpm THEN set flag indicating for sensor A is bad.
        IF fore sensor B < 350 rpm THEN set flag indicating fore sensor B is bad.
        IF aft sensor A < 350 rpm THEN set flag indicating that aft sensor A is bad.
        IF aft sensor B < 350 rpm THEN set flag indicating that aft sensor B is bad.
7. Compute phase $$\text{phase angle} = \frac{\text{Time front latch} - \text{Time rear latch}}{\text{Time front latch} - \text{Last time front latch}} \times 45°$$

The flowchart is written based on the assumption that each propeller 15 and 18 in FIG. 1 has eight blades, and, correspondingly, eight teeth on each target wheel 27 and 30. However, for ease of illustration, each propeller is shown as having only four blades.

Step 1 is a summation in which the total time for one revolution of a propeller is computed. This computation is done for each propeller. The computation is executed as follows. As stated above, when a tooth 45 passes the pickup 36, the signal produced on line 42 causes latch 51 to load the number presently existing on bus 54. In effect, latch 51 is loaded with the exact time of day at which tooth 45 passed pickup 36.

The fact that counter 57 counts from zero to 64 k and then starts over at zero again does not significantly affect this concept, as will be explained later. Further, the exact definition of what is meant by "passing" the pickup 36 will be explained in connection with Step 2.

The microprocessor 66, on a continuing basis, reads each latch 48 and 51, and places the real time data into a random access memory (RAM) array 70. One subarray of the RAM is indicated by four boxes 73 for blades 1–4 on propeller 15, and a similar subarray 75 for propeller 18.

The boxes in subarrays 73 and 75 are, in fact, RAM memory locations. Each box corresponds to a propeller blade. The usual sequence of operation would be: a tooth passes changing the number in latch 51. The microprocessor 66 reads latch 51 and stores the number just read in RAM 77 in subarray 73. A subsequent tooth passes coil 36, again changing the number in latch 51. The microprocessor 66 again reads latch 51 and then stores the number just read in another RAM 79, and so on, thereby storing the real-time occurrences of the strobe signals. This is tantamount to storing the real-times of tooth passings, which is tantamount to storing the real-time occurrences when blades cross a predetermined point, such as a point 82. The latter is true because the relative geometries of the propeller 15 and the toothed wheel 30 are known in advance from the construction of the propeller system.

As an example, for the clock rate of 2 Mhz described above, for an eight-toothed wheel and for a constant propeller speed of 1200 rpm, at a given instant the numbers contained in the RAM for propeller 15 might be those, such as "t=9,000", as shown. The reader will note that all numbers differ by 12,500, which is the number of counts occurring during the 0.00625 second interval between tooth crossings.

The microprocessor 66 also stores data in subarray 75 for the other propeller 18 in the same manner. The execution speed (say, 1 million assembly code steps per second) of the microprocessor 66 is so much faster than the strobe signals which change the data on the data bus 54 (say, 160 changes per second for an 8-toothed wheel at 1200 rpm), that no problem exists for the microprocessor to read and store both latches between latch strobing events.

The real-time information on blade crossings, which is stored in RAM 70, allows the microprocessor 66 to compute the time intervals ($\Delta T$'s) between successive blade crossings. The interval is the difference between the stored real-time for two successive blades, as shown by symbol $\Delta T$ in FIG. 1 near boxes 77 and 79. $\Delta T$ is, in this example, 12,500.

$\Delta T(1)$ refers to the time interval ($\Delta T$) between the crossing of tooth No. 8 and tooth No. 1. $\Delta T(2)$ refers to the time interval between the crossings of tooth No. 1 and tooth No. 2, and so on. Thus, Step No. 1 computes the total time interval for a single revolution of each blade.

Step No. 2 computes an error coefficient. One reason for the error coefficient is explained with reference to FIG. 5. During the manufacture of toothed wheels 6 in FIGS. 1 and 5, it is almost inevitable that a tooth 9A in FIG. 5 will not be located exactly at its intended position, but (1) may be displaced to phantom position 85, (2) may be oversized as shown by dashed lines 88, or (3) may be undersized as shown by dashed line 89. In any of the three cases, edges 90 can be displaced from intended positions 93, and by up to 0.1 degrees, indicated by angles $\theta$. Thus, the signals produced by pickup 12 will in fact occur at different times than if edges 90 were in their intended positions. As a consequence, the time intervals measured between the teeth bearing the edges 90 [shown as $\Delta T(1)$ and $\Delta T(2)$] will be different than the time intervals measured between teeth 9C and 9D, [i.e. $\Delta T(3)$ and $\Delta T(4)$], even if the toothed wheel 6 is rotating at a constant speed.

Unless corrected, the data in latch 51 in FIG. 1 would indicate that the wheel 30, and thus the propeller to which it is attached, is undergoing an acceleration followed by a deceleration because time interval ΔT(1) is less than time interval ΔT(4).

Further, even if the toothed wheel 30 were perfectly manufactured, nonuniformities in the reluctance of the wheel material can induce nonuniformities in the strobe signals. One reason is that the coil 12 is triggered by a given reluctance change in region 95. Both the composition of wheel 30, as well as the wheel geometry, are involved in the reluctance change. It is the given change in reluctance to which the coil 12 responds in order to infer a tooth's passing. Step 2 corrects the deviation in composition and geometry with an error coefficient.

As indicated in Step 2, m and n are indices. ("Modulo 8" means that the highest number used is 8, so that if n=6, m is not 10, but 2. 9 becomes 1, 10 becomes 2, 11 becomes 3, and 12 becomes 4. A kitchen clock could be viewed as "modulo 12." The highest number used is 12. Adding 4 hours to 11 o'clock does not yield 15 o'clock, but 3 o'clock. The "8" in "modulo 8" refers to 8 teeth.) For example, when m=1, then n=5, and thus, with 8 teeth, an error coefficient for the tooth opposite the tooth currently loading latches 48 and 51 in FIG. 1 is being computed. This has significance during accelerations and will be discussed in greater detail at the end of the Detailed Description. The error coefficient is computed by the equation shown in Step 2. The equation has the effect of normalizing the time interval for the opposite tooth with respect to one-eighth of the time interval for a full revolution. For example, if the toothed wheel were perfectly manufactured, and of a perfect material, and if the propeller speed were constant, all ΔT's in Step 1 would be identical. If the time for a full revolution were 8 units, then each ΔT would be 1 unit, and the error coefficient in Step 2 would be unity.

Figure 5:
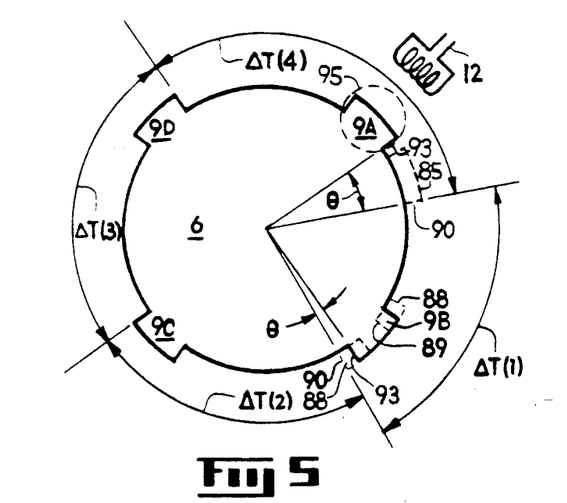
FIGS. 5 and 5A illustrate variations in positioning of the teeth 45 of the wheel 30 in FIG. 1.
Figure 5A:
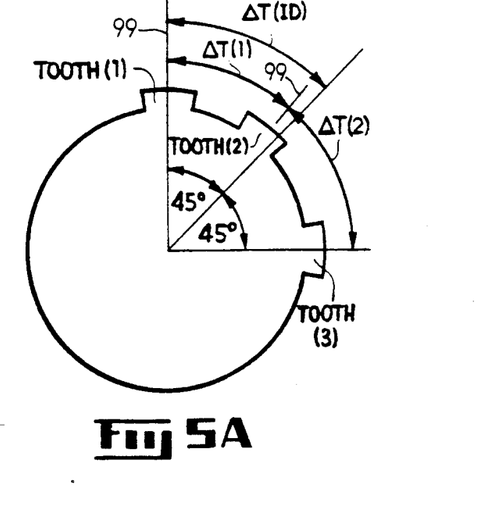

However, if time interval ΔT(1) in FIG. 5A were 3/4 units, and time interval ΔT(2) were 1¼ unit, then the error coefficient for tooth 1 would be 3/4 according to the equation in Step 2

$$\left(3/4 = \frac{8 \times 3/4}{8}\right).$$

(The ΔT's are referenced to lines 99 running through the centers of the teeth rather than through the edges for ease of illustration.) The error coefficient is a ratio of the actual time interval ΔT(1) in FIG. 5A to an idealized time interval ΔT(ID) at constant speed. ΔT(ID) would result from perfect geometry and perfect composition. ΔT(ID) is estimated by dividing TIME (full revolution) by 8, as FIG. 5A indicates.

The error coefficients are used in Step 4, but first the microprocessor 66 inquires whether an underspeed condition exists in Step 3. One such underspeed is engine idle. Another occurs during start-up. If the underspeed condition exists, all error coefficients are re-initialized to unity. One reason for reinitializing the coefficients to unit is that at such low speed there is no requirement for high accuracy of propeller speed measurements. Also, start-up seems a logical time to set variables, such as error coefficients, to nominal values, such as unity. Further, the 64 k range of counter 57 places a limit on the slowest speed that one can measure.

The error coefficients are thus useless at speeds below the limit, because speed isn't computed. This discussion will briefly digress to consider some problems with speed measurement at low speeds, beginning with reference to FIG. 6.

Figure 6:
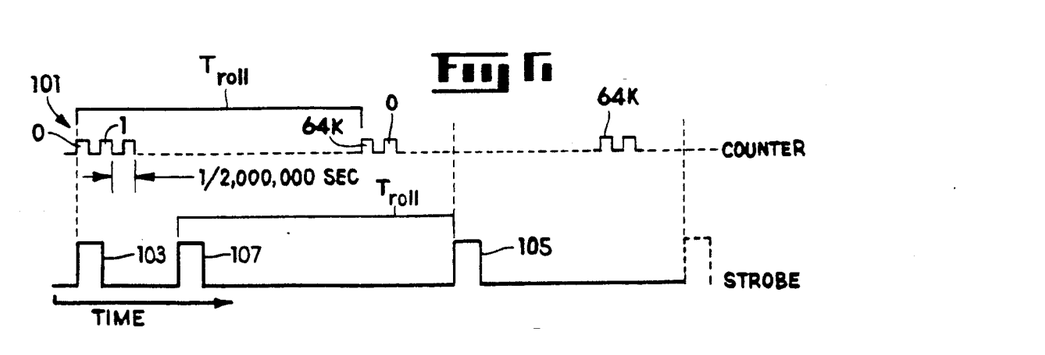
FIG. 6 illustrates a sequence of pulses produced by the counter 57 in FIG. 1, together with the strobe pulses identified in FIG. 1.

FIG. 6 shows a pulse train 101 produced by counter 57 in FIG. 1. The output of counter 57, while actually a constantly changing binary number, can be viewed for this explanation as equivalent to the pulse train 101 in FIG. 6, with each pulse separated by 1/2,000,000 sec as shown. If the pulse 103 produced by strobe 42, corresponding to the passage of a tooth 45 in FIG. 1, is separated from the following pulse 105 by a distance which is equal to or greater than 64 k × 1/2,000,000 secs, the microprocessor 66 cannot distinguish pulse 105 from a pulse 107 occurring exactly one $T_{roll}$ earlier. Both pulses 105 and 107 present the same real-time data to latches 48 and 51 on bus 54. The speed computed based on pulses 103 and 107 would be the same as that computed based on pulses 103 and 105, yet pulse 105 represents a slower actual speed.

Another way to state this is that strobe pulses 103 and 105 must be closer than 64 k counter pulses in train 101 in order to correctly compute the speed. In the case of 8 teeth, a 64 k counter, and a clock rate of 2 Mhz, the lowest rotational speed measurable is 228.7 rpm, computed as follows.

$$T_{roll} \text{ in FIG. 6} = \frac{65,536 \frac{\text{counts}}{\text{rollover}}}{2,000,000 \frac{\text{counts}}{\text{sec}}} = 0.0328 \frac{\text{sec}}{\text{rollover}} \quad (1)$$

$T_{roll}$ is the maximum time interval between two teeth. For an eight-tooth wheel, $T_{roll}$ corresponds to 228.7 rpm $$228.7 = \frac{1}{0.0328} \frac{\text{rollover}}{\text{second}} \times \frac{1}{8} \frac{\text{revolution}}{\text{rollover}} \times 60 \frac{\text{sec}}{\text{min}} \quad (2)$$

This limitation could be eliminated by using a counter larger than 16-bits, such as a 32-bit or larger counter which rolls over less often, thus increasing the time interval $T_{roll}$ in FIG. 6, but such would impose increased cost, as well as impose possible hardware availability problems.

This limit on speed measurement just discussed assumes that the data in RAM 70 is continuously updated. However, if the updating is not continuous, but periodic, a different limit is obtained. The different limit results chiefly from the fact that the 2 Mhz clock running the counter 57 can be asynchronous with respect to the clock running the microprocessor 66, as will now be explained.

There exists a larger control system (the "primary control system," not shown), for the engine and aircraft, with which the propellers 15 and 18 operate. The reader need not be concerned with the primary control system except to know that a larger computer program (the "primary program") for the primary control system must run, start to finish, every 10 milliseconds (msec). That is, the primary program repeats every 10 msec, as shown by arrows such as 150 in FIG. 7. The arrows 150 indicate the startups of the primary program. The 10 msec requirement is imposed by factors unrelated to the present invention.

The program of Table 1 herein (the "speed program") is run within the primary program every 4, 8, and 10 msec during each run of the primary program. The speed program can be viewed as a subroutine of the primary program. The runs of the speed program are illustrated as lines 155 in FIG. 7. The time required for one run of the speed program is short, say, 50 microseconds, a microsecond being 1/1,000,000 of a second. This time is so much faster than the 10 msec (i.e. 10/1,000 second) intervals between the startups 150 of the primary program, that the running time of the speed program cannot be drawn to scale on FIG. 7. The running time is too short. The running time would occur, for example, in the 50 microsecond interval between the times 49.975 and 50.025 shown in the Figure. Such a length of time would probably be invisible to the naked eye under the scale shown.

Therefore, the speed program runs every 4, 8, and 10 msec during each run of the primary program. The runs of the speed program are so fast that they can be viewed as instantaneous on the scale of FIG. 7. They can also be viewed as instantaneous with respect to $T_{roll}$, which is 32.8 msec. Each run of the speed program updates RAM 70 in FIG. 7, as explained above. The asynchronous aspect of the counter 57 and the microprocessor 66 will now be considered.

Figure 7:
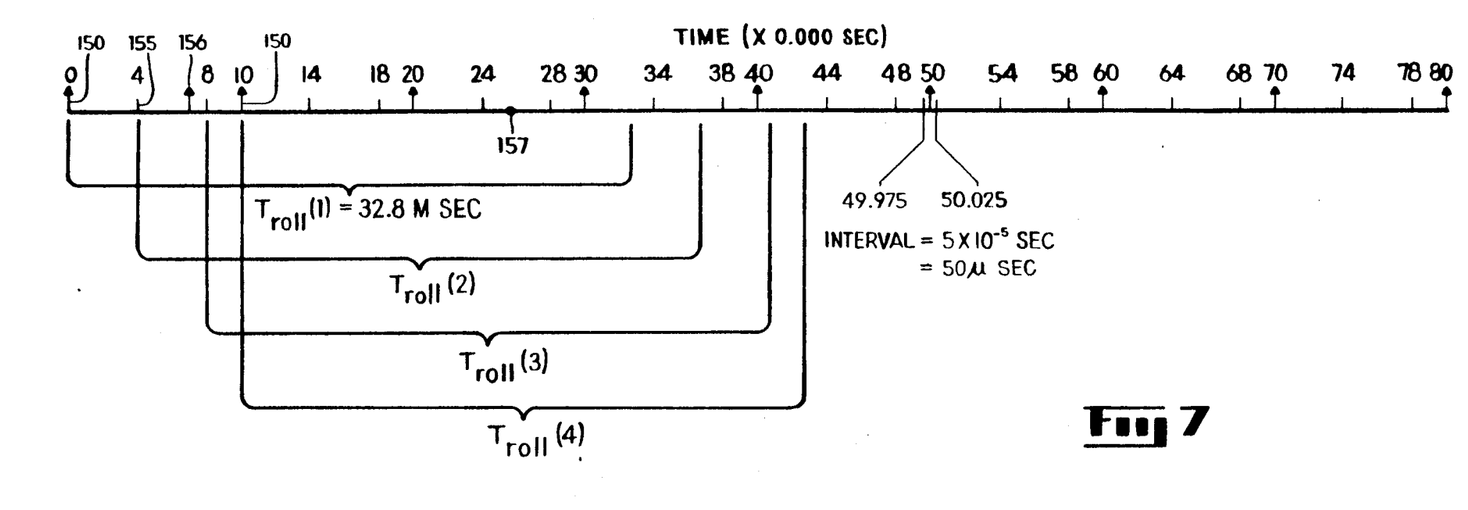
FIGS. 7 and 8 are timing diagrams used to explain the asynchronous operation of the counter 57 and the microprocessor 66 in FIG. 1.

Four $T_{rolls}$ are shown, beginning at 0, 4, 8, and 10 msec. Counter 57 in FIG. 1 can start at zero (i.e. rollover) at any of these points, or at any point in-between. Thus, in a sense, counter 57 and microprocessor 66 are asynchronous: the startup time 150 for the primary program does not necessarily coincide with the start of $T_{roll}$, nor does the startup time 150 have any fixed, known, relationship with the start of $T_{roll}$. In this asynchronous situation, the Inventors' analysis has led to this conclusion: subject to an exception identified later, the following relationship between runs 155 of the speed program must exist.

The speed program run immediately before a strobe occurs will be called FIRST. The subsequent speed program run 155 after the next strobe is called LAST. That is, the sequence is the following: FIRST occurs, then a strobe occurs, then zero or more intervening speed program runs, then a second strobe occurs, and then LAST occurs. In FIG. 1, FIRST can be run 155 at 4 msec, the strobe can occur at point 157, and LAST would therefore be the run at 28 msec.

Figure 8:
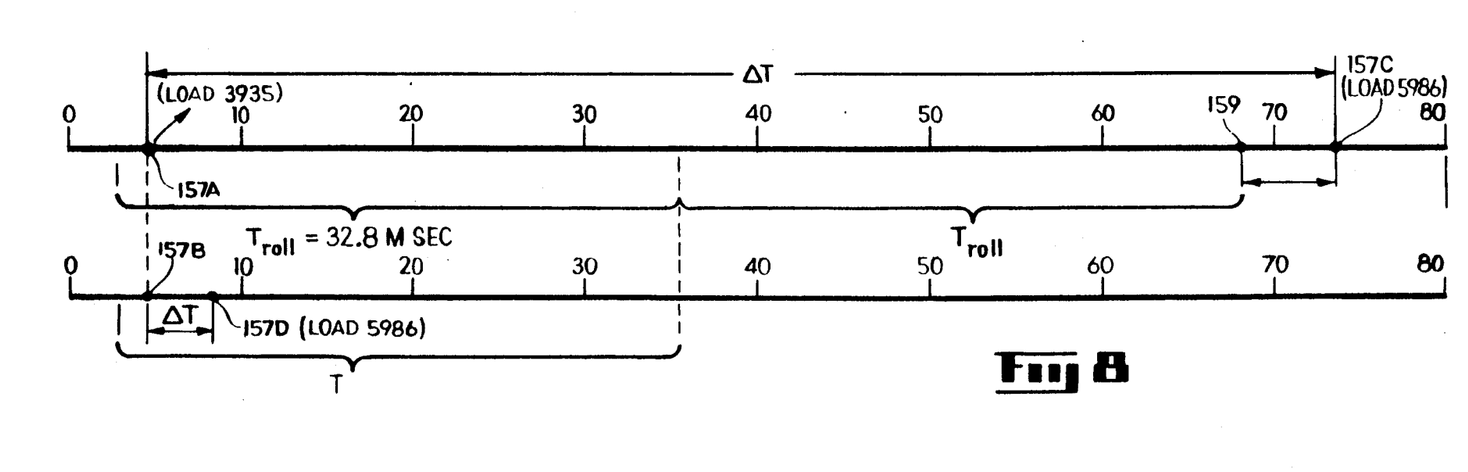

The Inventors have concluded that both FIRST and LAST must occur within the same $T_{roll}$ in order to guarantee that the problem discussed in connection with FIG. 6 will be avoided. Restated, if FIRST and LAST are not within the same $T_{roll}$, then it is not certain that the numbers in the latches 48 and 51 provide data from which speed can be accurately computed. FIG. 8 illustrates this problem.

Strobes 157A and 157B cause latch 51 in FIG. 1 to be loaded with a number, say 3935. Then, in one case, a later strobe 157C in FIG. 8, more than one $T_{roll}$ away, causes latch 51 to be loaded with a second number, say 5986. In another case, a strobe 157D can load latch 51 with an identical number (5986) because counter 57 rolled over at point 159. Thus, the speed program would see the same number (5986 in both cases), but this number represents vastly different ΔT's, as shown in FIG. 8. The requirement that both FIRST and LAST occur within the same $T_{roll}$ eliminates this error which is caused by the different ΔT's.

One may now inquire as to the slowest propeller speed which can be measured under the circumstances just described, namely, a $T_{roll}$ of 32.8 msec, an asynchronous repetition of the primary program every 10 msec, and a run of the speed program every 4, 8, and 10 msec within each repetition of the primary program.

One answer to the inquiry comes from the shifting of $T_{roll}$ back and forth between the four positions $T_{roll(1)} - T_{roll(4)}$ shown in FIG. 7, in search of the position of $T_{roll}$ which gives the smallest number of speed program runs between FIRST and LAST. For example, if the run at 0 msec is considered to be within $T_{roll(1)}$, and this run is FIRST, then LAST occurs at 30 msec. The intervening speed program runs are at 4, 8, 10, 14, 18, 20, 24, and 28 msec, a total of 8 intervening runs. Applying a similar analysis to the rest of the $T_{rolls}$, one derives the data in Table 2.

TABLE 2

| | FIRST occurs at | LAST occurs at | Intervening speed program runs at | No. of Intervening Speed Program runs | Min. ΔT |
|---|---|---|---|---|---|
| 1) | 0 msec | 30 msec | 4, 8, 10, 14, 18, 20, 24, 28 msec | 8 | 24 |
| 2) | 4 msec | 34 msec | 8, 10, 14, 18, 20, 24, 28, 30 msec | 8 | 22 |
| 3) | 8 msec | 40 msec | 10, 14, 18, 20, 24, 28, 30, 34, 38 msec | 9 | 28 |
| 4) | 10 msec | 40 msec | 14, 18, 20, 24, 28, 30, 34, 38 msec | 8 | 24 |
| 3) | (modified): 8 msec | 38 msec | 10, 14, 18, 20, 24, 28, 30, 34 msec | 8 | 24 |

Table 2 indicates that the smallest number of intervening runs of the speed program is 8, in the far right column. Therefore, if the data in latch 51, which is read during a speed program run, changes within eight or fewer runs of the speed program, then it is assumed that FIRST and LAST both occur during the same $T_{roll}$. If the data in latch 21 remains unchanged for more than eight consecutive speed program runs 155, then it is assumed that FIRST and LAST occur outside the same $T_{roll}$, and, therefore, the two strobes may have occurred outside the same $T_{roll}$.

The reader will note that the limit of eight unchanged latch readings has the effect of modifying line 3 in Table 2. If the actual $T_{roll}$ occurring is $T_{roll(3)}$ in FIG. 7, then LAST, in effect, occurs at 38 msec, not 40 msec as in line 3, because a latch change occurring after 38 msec, even though otherwise qualifying as a LAST, under the eight-run rule of Step 3 in Table 1, it is not used. This modification of line 3 is a consequence of the asynchronicity. Even though LAST occurs at 40 msec with $T_{roll(3)}$, one does not know that $T_{roll(3)}$ is actually the $T_{roll(3)}$, one does not know that $T_{roll(3)}$ is actually the $T_{roll}$ occurring. $T_{roll(1)}$ could be. Thus, any speed run following eight runs of unchanged latch data is, in effect, ignored.

The minimum speed which can always be measured under the eight-run rule is easily computed, once the rule has been derived. This speed is related to the smallest ΔT that could occur between two strobes separated by eight intervening program runs. This ΔT is the difference between the first intervening program run and the last, i.e. 28−4=24 msec for case 1 in Table 2. From Table 2, the minimum is 22 milliseconds (case 2). Computing in the same manner as in equation 2, for an eight-tooth wheel, the speed is 340.9 rpm.

$$340.9 = \frac{1000 \text{ msec/sec} \times 60 \text{ sec/min}}{8 \text{ teeth/revolution} \times 22 \text{ msec}}$$

If an underspeed condition does not exist, as determined by the eight-run rule, Step 4 then calculates the present speed. As the parenthetical expression shows, the speed is adjusted by ERROR(m) to accommodate any errors in tooth positioning shown in FIGS. 5 and 6. For example, let it be assumed that the full time of one revolution is 160,000 counts (i.e. ½ revolution per 20,000 counts), but that the time intervals $\Delta T(1)$ and $\Delta T(2)$ in FIG. 5A are 15,000 and 25,000 counts, respectively. The error coefficients in Step 2 for teeth 1 and 2 will be ¾ and 1¼, respectively. Thus, in Step 4 the actual speed computed based on $\Delta T(1)$ will be $$750 \text{ rpm} = \frac{314}{15,000} \times \frac{60 \times 2,000,000}{8}$$

That is, even though the time interval actually measured was 15,000 counts instead of 20,000 counts, the error coefficients allow the actual propeller speed at steady-state to be computed.

Figure 10:
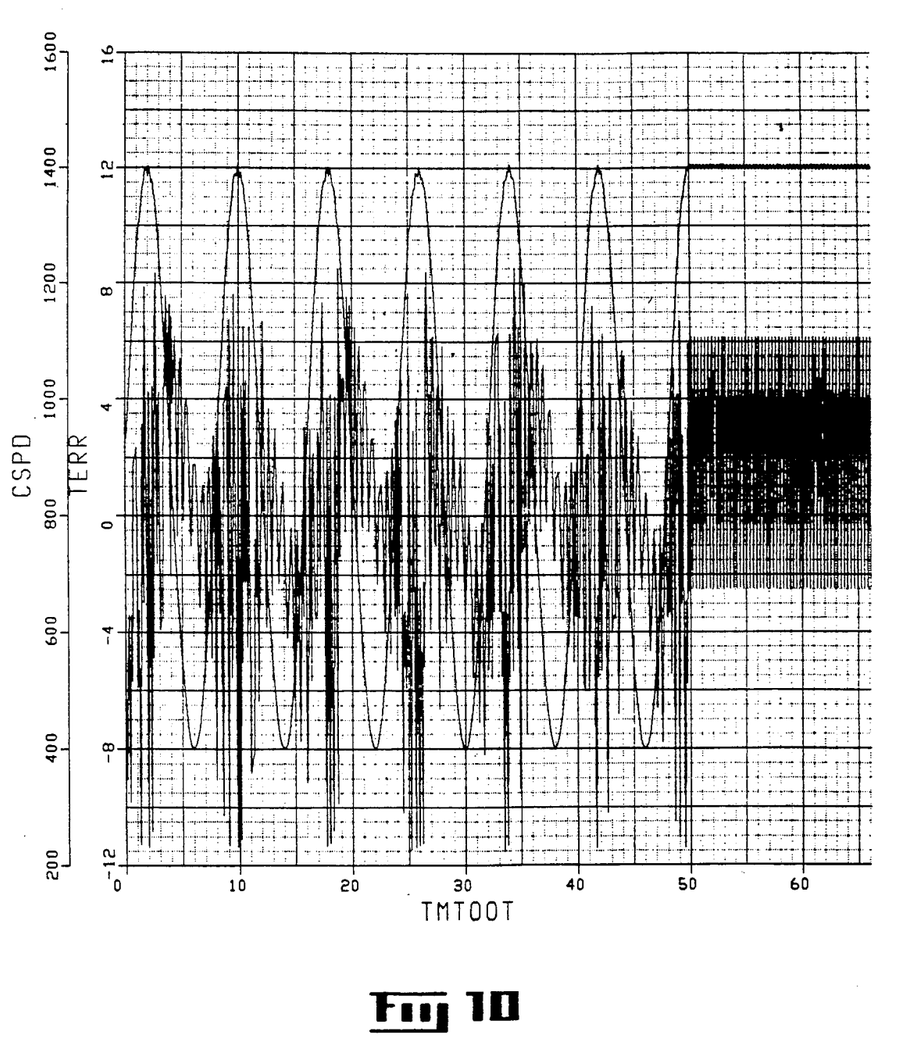
Figure 11:
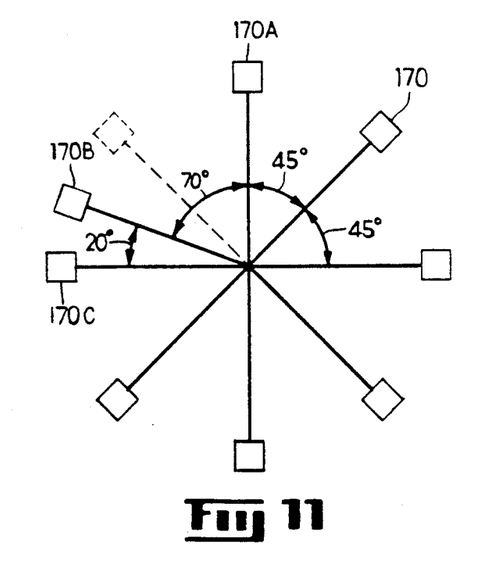
FIGS. 11 and 12 show two schematic arrangements of the teeth 45 in FIG. 1.

During accelerations and decelerations, however, the speed computed in Step 4 will be slightly different than the actual speed. The difference will be a function of the relative difference between the rate of propeller acceleration and the computational speed of microprocessor 66, or, in simpler terms, of how many times per second Step 4 is performed with respect to the rate of acceleration of the propellers. The Inventors have performed a simulation in which Step 4 was executed at the rate of 300 per second and the propellers were accelerated at a maximum rate of 393 rpm per second. FIG. 9 is a plot of measured propeller speed (CSPD) and measurement error(TERR) both in rpm. The measurement error is small, never exceeding 1 rpm. For comparison, FIG. 10 shows the same simulation with all error coefficients fixed at 1 (i.e. omitting calculation Step 2). The errors exceed 10 rpm. This is taken to demonstrate the effectiveness of the error coefficients.

The preceding discussion has assumed that single pickup coils 33 and 36 in FIG. 1 are used for each toothed wheel 27 and 30. However, it may be desirable to provide second, backup coils 110 and 113, together with backup latches 115. The Inventors here point out that using the backup sensors 110 and 113, four speeds are now computed: Step (5) is executed for each of four sensors. The sensors (i.e. coils 36 and 113) for propeller 15 will be termed sensors A1 and A2 in Table 1, and, similarly, for propeller 18, sensors B1 and B2. Step 5 checks the sensors for proper functioning. The phrase "sensor A1" is an abbreviation for "the speed computed based on sensor A1." 5.1 inquires whether the speeds indicated by both sensors for a given propeller are sufficiently similar; in this case, whether within 40 rpm of each other. If so, the speed is taken as the average of the two speeds and a flag for each sensor is reset indicating that both the sensors are good. A flag can be any type of memory device, such as a memory location in RAM.

If the difference in speeds fall outside the 40 rpm range, then Step 5.2 is executed. Step 5.2 first inquires whether both the speeds of the other propeller (the aft propeller in this example) are "good" based on Step 5.1: that is, within 40 rpm of each other. Steps 5.2.1 and 5.2.2 state in more detailed form the following inquiry: of sensors A1 and A2 (for fore propeller 15), which deviates more from the speed (e.g. "aft speed") indicated by the other propeller's sensing system? (Aft speed is the speed computed for the aft propeller in Step 5.1.) The sensor with the smallest deviation is taken as the good one. If Step 5.2 indicates that both sensors B1 and B2 are not "good" (that is, the "aft speed" is not a reliable judge), then Step 5.3 is executed. 5.3 asks which sensor is indicating the lower speed? The sensor indicating the lower speed is chosen because the Inventors consider it preferable to overspeed the propellers 15 and 18 in case of sensor failure rather than to underspeed them. Choosing the lower speed sensor causes the propeller speed control equipment (not discussed herein) to believe that the propellers are going slower than proper, and the equipment thus tries to accelerate the propellers, thus overspeeding them.

Step 6 is a double check. A common failure of all four sensors, such as an electrical failure of the excitation circuit (not shown), can cause Step 5 to set good flags for all four. Step 6 prevents this. The "IF" statement at the beginning has three conditions. (1) Core speed must exceed 10,000 rpm. (Core speed refers to the speed of the high speed turbine of a gas turbine engine which may power the propellers.) (2) The deviation of the actual pitch of propeller 15 from the scheduled pitch must be less than 3° and, similarly, (3) the pitch deviation of propeller 18 must be less than 3°. The existence of these conditions indicates that the propeller system is operating under power conditions. Under these engine and pitch conditions, it is assumed highly unlikely that either propeller would be operating at less than 350 rpm. Therefore, if a reading of 350 rpm or less is obtained, the sensor providing that reading is considered to be faulty and a flag is set accordingly.

Figures 2, 3:
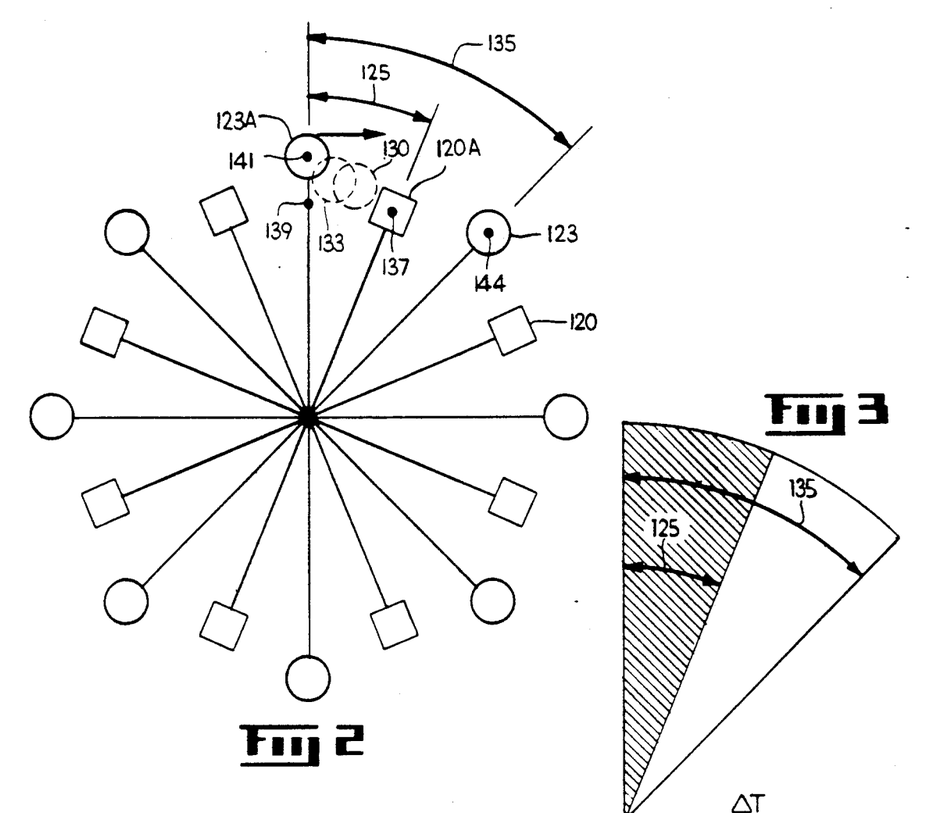
FIG. 2 is a schematic of a pair of counterrotating propellers.
FIG. 3 illustrates two arcs 125 and 135, which are also shown in FIG. 2.

Thus far, only speed sensing has been considered. However, in a counterrotating propeller system, sensing of the phase angle between propellers may also be desired. Phase is defined with reference to FIG. 2. FIG. 2 schematically shows an end on view of two coaxial propellers. One propeller's blades is indicated by squares 120, the other propeller's blades is indicated by circles 123. Phase angle as defined as the angle 125 between a blade on one propeller and the nearest blade on the other propeller in the clockwise direction, but measured at the instant when blade 123 is at a predetermined position, such as the 12 o'clock position shown. The actual angle 125 will, of course, be constantly changing because the counterrotating blades are moving toward each other. However, when measured at the predetermined time just described, if the propellers are operating at identical, constant speeds, the phase angle will be a measurable constant.

The phase angle, in effect, describes the crossing points in space of the propellers blades. For example, blades 123A and 120A, if traveling at identical speeds, will cross approximately at region 130. For acoustical and other reasons, it is sometimes desirable to control this crossing point, as by moving the region 130 to region 133 in FIG. 2.

The present invention measures phase angle in Step 7. Step 7 is believed to be self-explanatory. In effect, Step 7 is the ratio of two time intervals. The intervals can be illustrated by arcs 125 and 135 in FIG. 3. Arc 125 represents the length of time taken by blade 120A in FIG. 2 to travel from point 137 to point 139. Similarly, arc 135 (also shown in FIG. 2) represents the time interval for blade 123A to travel from point 141 to point 144. The ratio of the two arcs (or angles) is the phase.

The reason that this ratio indicates phase angle is that it gives the relative position of blade 120 in FIG. 2 with respect to blade 123A when blade 123A is at a predetermined position, such as at the 12:00 position shown. When blade 120A is closer to blade 123A (angle 125 is smaller), then the phase in Step 7 will be smaller. The converse is also true.

The phase angle measured in Step 7 actually calculates what percentage angle 125 is of angle 135 in FIG. 3. The larger the percentage, the closer blade 120A in FIG. 2 is to point 144 when blade 123A is at the 12:00 position. Therefore, the phase angle indicates the relative position of blade 120A when blade 123A is at the 12:00 position.

An invention has been described wherein the rotational speed of an aircraft propeller is computed many times per revolution. The invention includes a tachometer. For example, at 1200 rpm, one revolution takes 50 msec (0.050 sec). Under the timing of FIG. 7, 16 speed program runs occur between 0 and 50 msec, inclusive: the speed is computed 16 times per revolution. The invention can compute this speed in a counterrotating pair of aircraft propellers. Further, the invention also computes phase angle of the counterrotating propellers at the same rate of 16 times per revolution. The invention thus provides the aircraft computer and the pilot with performance data which is nearly instantaneous with measurement of the $\Delta T$'s.

It was stated in the Background of the Invention that it may be desirable to know when the blade No. 1 was located at the 1:30 o'clock position. This can be accomplished by adding a counter (not shown) which counts the rollovers of counter 57. A second set of memory locations in addition to RAM 70 can be used to store the data taken from the second counter. The microprocessor 66 would then read the second counter at each reading of latches 48 and 51, and store both counter values at the pair of memory locations for the tooth 45 in question. For example, a reading of 5 on the rollover counter when a latch holds a value of 12,000 would indicate that the tooth causing the latch to load 12,000 crossed the coil 36 at real-time of 164,006 msec ($164.006 = 5 \times 32.8$ msec $+ 12,000/2,000,000 \times 32.8$ msec).

An invention has been described which measures $\Delta T$'s by using a magnetic pickup coil 36 in FIG. 1. An alternate form would use an optical pickup, known in the art, to sense the flag passings.

One important aspect of the invention can be explained with reference to FIGS. 5 and 5A. As stated above, at constant speed, a deviation of a tooth from its intended position will cause the measured $\Delta T$ to deviate from the idealized $\Delta T$. This deviation is used to compute an error coefficient in Step 2 above. Then, later, when a time interval is again measured based on the deviant tooth, the actual speed can be computed from both the measured (i.e. not idealized) time interval and the error coefficient. In a sense, the idealized $\Delta T$ is regenerated from the measured $\Delta T$.

Figure 12:
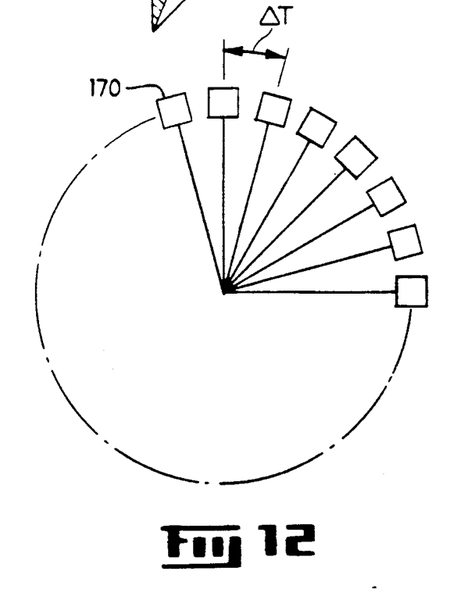

The invention operates as in the following example. Let it be assumed that the squares 170 in FIG. 12 are, in fact, the teeth (i.e. flags) 45 in FIG. 1. Let it be further assumed that the angle between all neighboring flag pairs is 45 degrees, but that flag 170B is displaced such that the angle between flags 170B and C is 20 degrees, while the angle between flags 170A and B is 70 degrees. The total angle between flag 170A and C is thus 90 degrees. Let it further be assumed that the time of one revolution at constant speed is eight seconds. With these assumptions, $\Delta T(ID)$ is one second and the measured $\Delta T$'s will each be one second, with two exceptions. Flags 170B and C have a $\Delta T$ of $20/45 \times 1$ second, while flags 170A and B have a $\Delta T$ of $70/45 \times 1$ second.

The error coefficients compare the measured $\Delta T$'s with the idealized $\Delta T$. The error coefficients allow one to derive the actual angles between the flags, in at least two ways: (1) the error coefficient for the 20 degree angle is 20/45. It is known that the idealized $\Delta T$ represents an angle of 45 degrees, and thus the actual angle is the error coefficient times the idealized angle: $20/45 \times 45 = 20$. (2) the entire set of flags describe a circle, which contains 360 degrees. The $\Delta T$ for the 20 degree interval was 20/45 sec. Since the entire circle represents eight seconds, $20/45 \times 360/8$, or 20 degrees is obtained as the angle.

Knowledge of the angle between flags allows one to compute the speed based on the $\Delta T$'s. In the example above, the $\Delta T$ between flags 170B and C of 20/45 sec allows the speed to be computed: 20/45 sec for 20 degrees of travel corresponds to 1/45 sec for one degree, or 360/45 (namely, eight seconds), for the entire set of flags over 360 degrees, consistent with the assumed speed.

Therefore, once the error coefficients are established, the actual angular positions of the flags becomes known. Then, from a single $\Delta T$, the speed can be inferred. This is true, in principle, even with a grossly skewed distribution of flags as shown in FIG. 12. Having the error coefficients, which contain data as to the angular separation of the flags, one can compute the angular speed of the propeller based solely on the $\Delta T$ shown. A full revolution is not needed, and, in fact, the speed can be computed several times during one revolution, providing highly up-to-date information.

The invention can be viewed as developing and storing a collection of data, including the $\Delta T$'s and the time elapsed for a total revolution, from which the flag positions can be computed. A model of the target wheel is generated in RAM, so to speak.

This discussion has considered only the effect of the positions of flags upon the $\Delta T$'s. However, as stated earlier in connection with FIGS. 5 and 5A, not only position, but also the geometry and composition of the flag are involved in the $\Delta T$'s. Thus, the $\Delta T$'s which the invention measures do not necessarily have a clear relationship with the teeth or the edges 90, as shown in FIG. 5. However, the $\Delta T$'s do, in fact, have a consistent relationship with the edges 90. For example, $\Delta T(1)$ in FIG. 5 may be measured for teeth 9A and B. $\Delta T(1)$ does not end with edge 93, but on phantom edge 90. This causes no problem because this $\Delta T$ will, in general, always end on phantom edge 90. Thus, the $\Delta T$'s do not establish the actual geometric angular spacing between adjacent teeth, but instead, establish what will be called the angles between the "effective" locations of adjacent teeth. Phantom edge 90 is one such "effective" location.

It was stated earlier in connection with the explanation of Step 2 that the error coefficients are computed for the blade opposite to the one which just loaded a latch. One reason for this will be explained by an example.

Assume that the last tooth to pass was tooth No. 8, and $\Delta T(8)$ has just been computed. Therefore, $n=8$. Also assume a deceleration is occurring, indicated by continually increasing $\Delta T$'s, as shown in Table 3.

TABLE 3

| | |
|---|---|
| $\Delta T(1) = 12,100$ | $1 = (n + 1)$ modulo 8 |
| $\Delta T(2) = 12,200$ | $2 = (n + 2)$ modulo 8 |
| $\Delta T(3) = 12,300$ | $3 = (n + 3)$ modulo 8 |
| $\Delta T(4) = 12,400$ | $4 = (n + 4)$ modulo 8 |
| $\Delta T(5) = 12,500$ | $5 = (n + 5)$ modulo 8 |

TABLE 3-continued

| | |
|---|---|
| ΔT(6) = 12,600 | 6 = (n + 6) modulo 8 |
| ΔT(7) = 12,700 | 7 = (n + 7) modulo 8 |
| ΔT(8) = 12,800 | 8 = n |

Therefore, in this example,

Time(full revolution)/8 = 99,600/8 = 12.450

This is the estimated ΔT(ID).

As stated above, the error coefficients are, in effect, a ratio of actual ΔT to ΔT(ID). It was also stated that ΔT(ID) is estimated from eight consecutive ΔT's. Further, speed is computed, in Step 4, from individual ΔT's, perhaps several times per revolution. The Inventors have found that, during a constant acceleration or constant deceleration, adding 4 or 5 to the index in Step 2 will give a more accurate speed computation from a single ΔT, by giving a truer error coefficient through a better estimated ΔT(ID). This is shown in Table 3, in the right column.

Numerous substitutions and modifications can be undertaken without departing from the true spirit and scope of the present invention. What is desired to be secured by Letters Patent is the Invention as defined in the following claims.

We claim:

1. In a tachometer for measuring rotational speed of an aircraft propeller and having a target wheel (6) bearing flags (9) which trigger strobe signals in a sensor (12), a system for compensating for nonuniformities in timing of the strobe signals, comprising:
    (a) means for measuring actual time intervals between strobe signals;
    (b) means for developing an idealized time interval;
    (c) means for developing error coefficients by comparing the actual time intervals with the idealized time interval; and
    (d) means for computing the rotational speed of the propeller based on one actual time interval and one of the error coefficients.

2. A system for computing rotational speeds of counterrotating aircraft propellers, comprising:
    (a) first and second target wheels fastened to respective first and second propellers, each target wheel bearing a number of flags;
    (b) first and second sensors for producing first and second strobe signals in response to passage of flags by the sensors;
    (c) clock means for providing a time signal;
    (d) first and second latch means for receiving the time signal and storing the time signal in response to the respective strobe signals;
    (e) memory means for storing data obtained from at least one of the latch means and from which the time intervals between consecutive flags on one of the target wheels can be computed;
    (f) computation means for
        (i) computing total time elapsed for passage of two or more flags;
        (ii) computing error coefficients for modifying the time intervals of (e) to compensate for irregularities in distribution of the flags on a wheel;
        (iii) computing speed of the propellers based on the time intervals of (e) and the error coefficients of (f) (ii).

3. A system for computing rotational speeds of first and second propellers in a pair of counterrotating propellers, comprising:
    (a) a first target wheel connected to the first propeller and bearing a first set of flags, and a second target wheel connected to the second propeller and bearing a second set of flags, each set of flags having a distribution which is not necessarily uniform;
    (b) a first sensor for producing a first strobe signal in response to passage of a flag in the first set of flags, and a second sensor for producing a second strobe signal in response to the passage of a flag in the second set of flags;
    (c) a clock for providing a time signal;
    (d) a first latch means for storing the time signal existing upon occurrence of the first strobe signal, and a second latch means for storing the time signal existing upon occurrence of the second strobe signal;
    (e) processor means for
        (i) reading the latches of (d) and storing the time signals read from the latches in a memory array;
        (ii) computing total elapsed time for the passage of a selected number of flags on each target wheel;
        (iii) computing error coefficients which indicate nonuniformities in flag distribution; and
        (iv) computing the speeds of the propellers based on the stored signals of (d) and the error coefficients of (f) (iii).

4. Apparatus according to claim 2 or 3 and further comprising means for ascertaining phase relationship between the propellers.

5. In a method of measuring rotational speed of an aircraft propeller using flags which produce signals as they pass a sensor, the improvement of compensating for nonuniformities in flags comprising the following steps:
    a) deriving an ideal time interval expected to occur between signals;
    b) measuring an actual time interval occurring between signals; and
    c) deriving an error coefficient based on the actual time interval and the ideal time interval.

6. A method according to claim 5 in which the error coefficient includes a ratio of the actual time interval to the ideal time interval.

7. In a system for computing rotational speed of an aircraft propeller, an apparatus for correcting time intervals comprising:
    a) target wheel connected to the propeller and bearing several flags;
    b) a sensor which produces a sequence of strobe signals, each separated from the next by a time interval, when a respective sequence of flags passes the sensor;
    c) measurement means for measuring the time intervals; and
    d) error correction means for modifying the time intervals.

* * * * *